April 26, 1949.  A. ARDOIN ET AL  2,468,478
MACHINE TOOL

Filed March 22, 1945  7 Sheets-Sheet 2

INVENTORS
AIME ARDOIN,
MICHEL CHENILLAT,
BY
Robert B Larson ATTORNEY

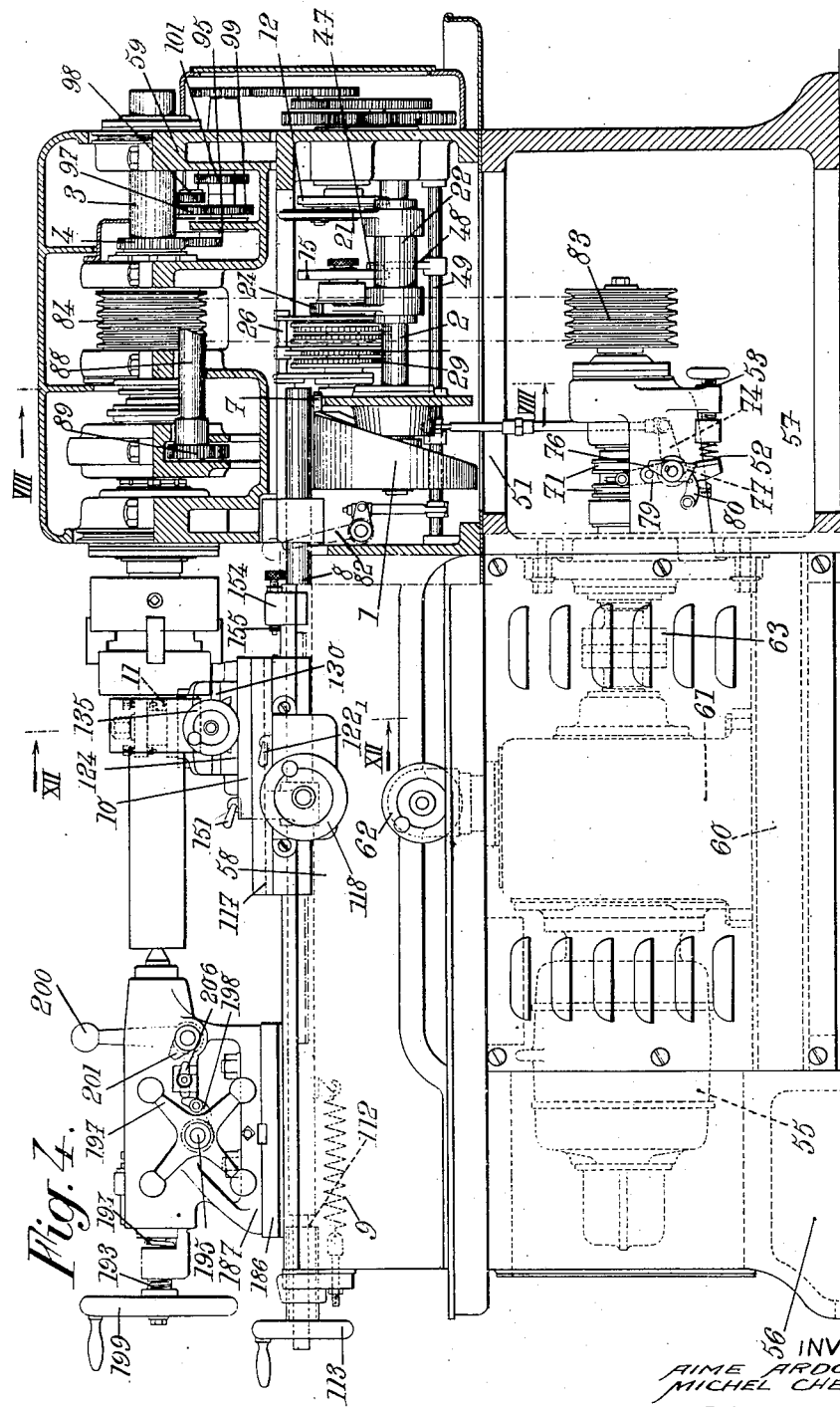

April 26, 1949. A. ARDOIN ET AL 2,468,478
MACHINE TOOL
Filed March 22, 1945 7 Sheets-Sheet 4
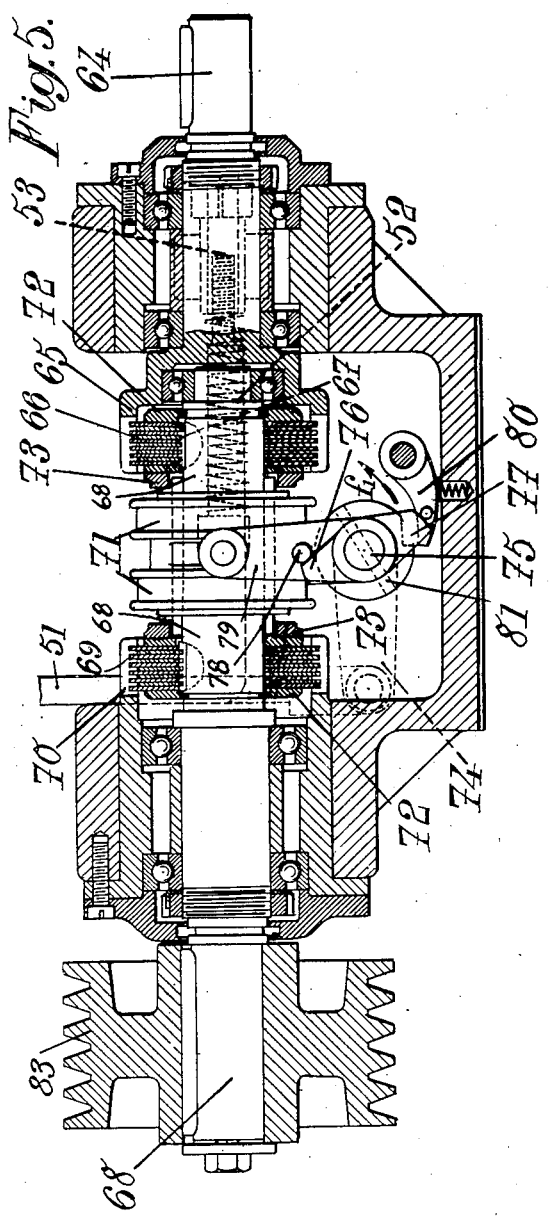
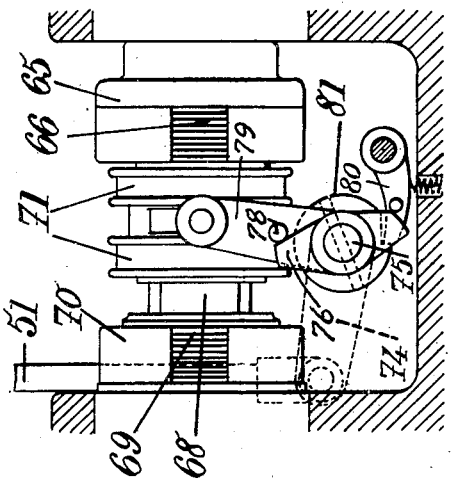
INVENTORS
AIME ARDOIN,
MICHEL CHENILLAT,
BY
Robert B. Pearson ATTORNEY

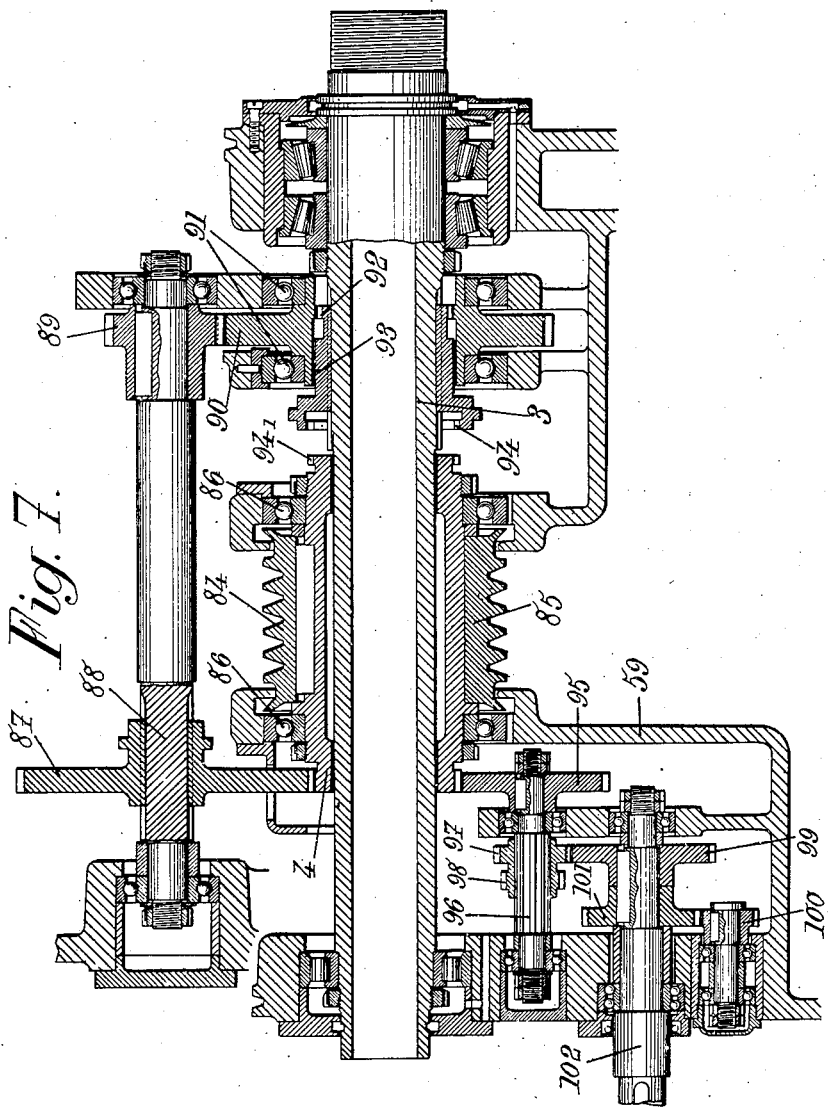

April 26, 1949.  A. ARDOIN ET AL  2,468,478

MACHINE TOOL

Filed March 22, 1945  7 Sheets-Sheet 6

INVENTORS
AIMÉ ARDOIN,
MICHEL CHENILLAT,
BY
Robert B. Larson  ATTORNEY

April 26, 1949.

A. ARDOIN ET AL 2,468,478

MACHINE TOOL

Filed March 22, 1945

INVENTORS
AIME ARDOIN,
MICHEL CHENILLAT,
BY
Robert B Pierson
ATTORNEY

Patented Apr. 26, 1949

2,468,478

UNITED STATES PATENT OFFICE 2,468,478

MACHINE TOOL

Aimé Ardoin, Saint-Jean-de-la Ruelle, and Michel Chenillat, La Chapelle-Saint-Mesmin, France, assignors to Etablissements Aera, Orleans, France, a society of France Application March 22, 1945, Serial No. 584,114
In France December 23, 1943

Section 1, Public Law 690, August 8, 1946
Patent expires December 23, 1963

10 Claims. (Cl. 82—19)

The present invention relates to machine tools, in particular of the lathe type, that is to say machines in which the tool is given both a longitudinal and a transverse movement, and it relates more particularly to screw cutting lathes in which a screw thread is formed by a tool which is given both a longitudinal feed corresponding to the pitch or to a multiple of the same, and a transverse feed corresponding (generally in several cuts) to the depth of the screw thread to be obtained.

Its main object is to render such machines more satisfactory in practice, and in particular, to enable them to carry out the work under better conditions (concerning precision, finish, price, etc.), with simpler operations which do not require qualified operators, and with the possibility of producing screw-threads of any kind.

Preferred embodiments of our invention will be hereinafter described, with reference to the accompanying drawings, given merely by way of example, and in which Figs. 1 and 2 of these drawings diagrammatically show respectively in elevation and in side view (Fig. 2 showing only the sliding carriage and the tool actuating members), a screw cutting machine according to the invention.

Fig. 3 separately shows, in diagrammatic perspective, certain motion transmitting devices embodied in this machine;

Fig. 4 shows in elevation, with parts in section, a screw cutting machine constructed in accordance with the principles illustrated in Figs. 1 to 3.

Figs. 5 and 6 separately show, on a larger scale and viewed from the rear (with respect to Fig. 4), the device for throwing the machine into action and for braking it.

Fig. 7 separately shows, on a larger scale and also viewed from the rear, various transmission devices of this machine.

Fig. 8 separately shows on a larger scale, in section on the line VIII—VIII of Fig. 4, the arrangement of the various cams for the longitudinal feed, the return movement and the transverse feeds, including the device for regulating the number of cuts.

Figure 11:
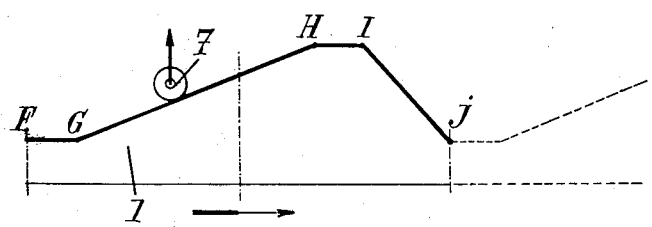

Fig. 11 diagrammatically shows, in a developed view, the profile of the cam for the longitudinal feeds.

Figures 9, 12:
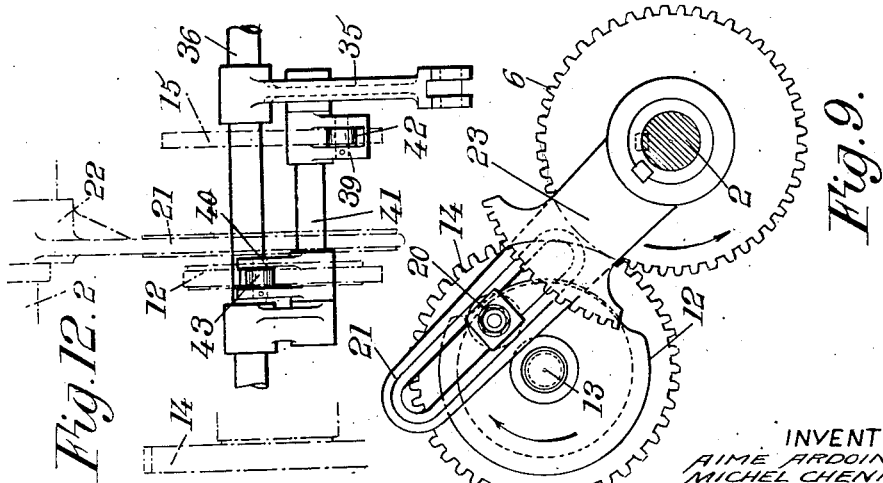
Fig. 9 is a separate view of some elements of Fig. 8.

Fig. 12 separately shows, in plan view, elements of the transmission system provided between the two cams for controlling the return movement and the transverse feed and the cam for controlling the depth of cut.

The screw cutting machine according to our invention is constructed in the form of a lathe provided with means for giving the tool on the one hand a longitudinal reciprocating motion parallel to the axis of the lathe spindle on the other hand transverse movements constituted by the combination of a reciprocating motion corresponding to active cut stroke and return of the tool, and to the transverse feed.

It has already been proposed to produce these movements through the combination of cams and of kinematic means, in particular adjustable levers. However, the solutions offered involved interdependency between the working of the various elements of the unit, so that it was not always possible separately to control one of the parameters characterizing the operation of the machine, to wit:

Pitch,
Length of screw,
Total cutting depth or depth of the screw threads to be obtained,
Number of cuts to be performed to obtain this depth of cutting.

According to our invention, each function is exerted by a separate cam the setting or speed of which can be independently controlled.

In accordance with a preferred embodiment (Figs. 1 to 3), in order to obtain the longitudinal to and fro movement, we make use of the usual pitch cam 1, removably mounted on a shaft 2 driven from a spindle 3, for example through a gear train diagrammatically shown at 4—5—6 and preferably having a variable transformation ratio. Cam 1 cooperates with a roller 7 carried by a shaft 8 subjected to the action of a return spring 9 and on which is mounted the tool carrying carriage—or an element 10—thereof with tool 11.

In order to ensure the reciprocating movement of the tool toward and away from the work piece, we make use of a second cam 12, hereinafter called return cam, which therefore does not participate in the generation of the screw thread, but which is chiefly intended to bring the tool into position for the next cut and to withdraw it from the screw thread at the end of the cut so as to permit quick return of said tool, this cam being driven at the same speed as the preceding one. In the embodiment illustrated, it is carried, for example, by a shaft 13 parallel to the shaft 2 and connected thereto by gears 6 and 14.

In order to ensure transverse feed of the tool on each longitudinal cut, we make use of a third cam 15, hereinafter called advance cam, which preferably has a progressively variable profile and is driven in such manner as to turn, during the screw cutting or similar operation to be performed, a given rotation (preferably 360° so that, once the work is completed, it resumes its original angular position) adapted to be divided into as many fractions $n$ as there are cuts to be taken during said work. For this purpose, this cam 15 is driven from a shaft 16, in turn connected with the shaft 2 through a suitable driving mechanism, in particular of the step by step type, with adjusting means for altering the movement, i. e. number $n$.

Finally, in order to control the transverse movement of the tool from the two preceding cams (return cam and advance cam), we make use of a fourth cam 17 (Figs. 2 and 3) carried by a shaft 18 and adapted to be given a transverse movement through the combined action of these two cams and of a suitable kinematic device. This angular movement is transformed, for example by means of a finger 19, into a transverse movement of the carriage 10 or of a transverse element of this carriage. Thus the total rectilinear advance of the tool, or, in other words, the depth of cut—in the present case the depth of the screw thread—is essentially dependent on the shape of the active profile of the cam 17 in contact with the finger 19 and it becomes possible, through the use of suitable adjusting means for modifying this profile, to vary the depth of cut. This cam 17 will be hereinafter called depth cam.

The means for actuating the advance cam 15 with a variable step by step motion are arranged as follows, by way of example:

A lever 21, actuated, for example by the return cam 12, by means of a finger 20, is caused to oscillate freely by means of a sleeve 22, about the shaft 2 and drives a toothed segment 23 in mesh with a pinion 24 freely mounted on shaft 16 and rigid with a lever 25 adapted to drive, through a shaft 26, a ratchet device comprising a tooth 27 and a catch 28.

The tooth 27 is applied against a ratchet wheel 29 rigid with the shaft 16 (and therefore with the advance cam 15), by means of a spring (not shown), whilst the catch 28 can bear during part of its travel, upon the outer surface of a cam-shaped member 30, freely mounted on the said shaft and constituting a disconnector device.

Finally, to cause this disconnector device to assume several different positions of adjustment, we provide a handle 31, and a pegging device comprising a stop finger 32 adapted to engage into any of a plurality of holes 33 provided in a sector 34.

Thus, for every revolution of shafts 2 and 13, the arm 21 turns through a given angle corresponding to the maximum number of teeth by which the catch 27—28 can rotate the ratchet wheel 29. However, it is possible to vary the number of teeth that correspond effectively to this rotation by altering, by means of the disconnector, the position of the ratchet for which it engages the wheel; consequently, in accordance with the position of the disconnector, the angular feed of the advance cam, upon every revolution of shafts 2 and 13, therefore upon every cut, is variable; likewise, the number $n$ of cuts for a complete revolution of the cam 15, that is, during the time of machining of the work piece, is variable.

Figure 10:
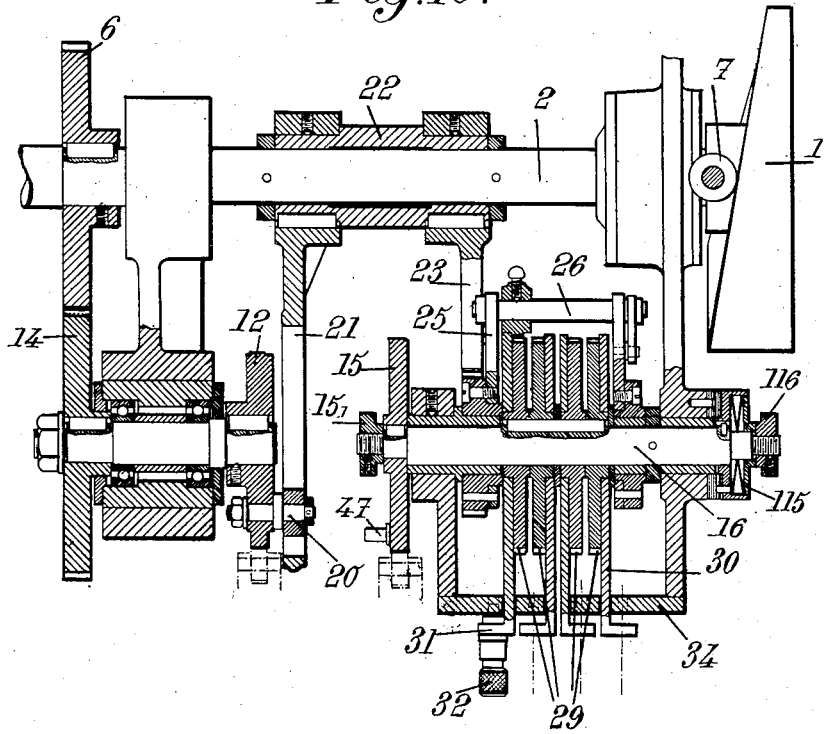
Fig. 10 is a section, on the line X—X of Fig. 8.

It should be noted that the arrangement is such that the catch engages the ratchet wheel when the parts in reciprocating motion are in dead center position. Noise and wear as might result from shocks are thus avoided. Moreover, a brake is provided on shaft 16, which brake may consist of a plate spring 115 adjustable at 116, as shown by Fig 10; in this manner, further rotation of the ratchet wheel due to inertia of the masses, which would render the number of cutting operations inaccurate, is avoided.

A retaining catch may also be provided, ensuring the feed of the ratchet wheel, tooth after tooth, independently of any parasitic forward or rearward movement.

Moreover, it is preferable—as diagrammatically shown by Fig. 1 and as will hereinafter appear with reference to Figs. 4 and 10—to provide several ratchet wheels such as 29 comprising a different number of teeth, each having an adjustable disconnector, which permits of choosing the number of cuts inside a very wide range.

Figure 3:
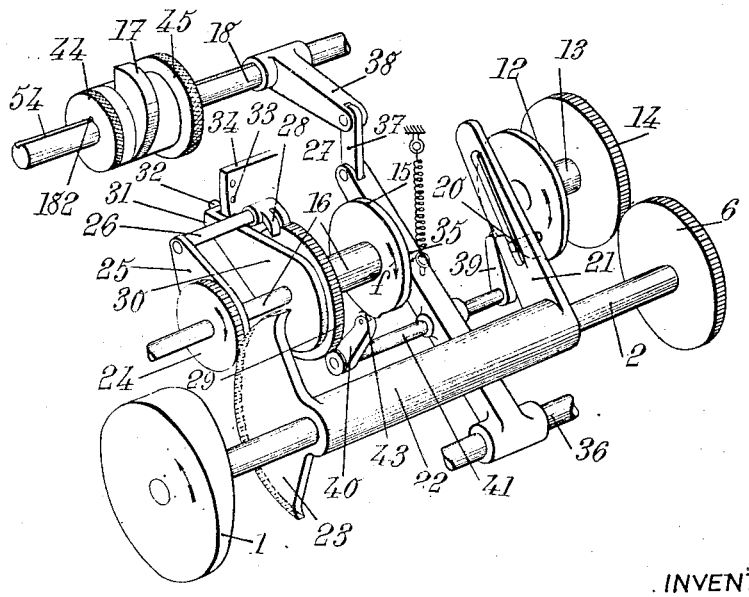

The kinematic device to be inserted between the return and advance cams, on the one hand, and the depth cam, on the other hand, preferably made as shown by Figs. 3 and 12 and includes in particular:

A lever 35 pivoted on a shaft 36 and adapted to control, by means of a rod 37 and an arm 38, the rotation of the shaft 18 which drives the depth cam 17;

And a spindle 41 journalled in this lever 35 and carrying two arms 39 and 40 rigid therewith, these arms being provided, at their ends with rollers 42—43 adapted to be applied against the cams 12 and 15, respectively under the action of suitable resilient means.

Thus the movement transmitted to the shaft 18 is a to and fro movement of an amplitude determined by the return cam but which, upon every cut, undergoes an advance corresponding to the variation of profile of the advance cam during the fraction of revolution imparted thereto by the catch 27.

In the drawings, suitable shapes for the profiles of the return and advance cams have been shown.

The return cam 12 comprises two concentric sectors of which one AB, of smaller radius, corresponds to the retracted position of the tool, whilst the other CD, corresponds to its position of work. $f$ designating the direction of rotation, it will be seen that the feed stroke corresponds to BC and the return (withdrawal from the thread) to DA.

It should be noted that positioning of this return cam with respect to the pitch cam 1 follows from the meshing of the pinions 6 and 14 and is suitably chosen to enable the tool to be withdrawn at a definite time of the working phase.

The advance cam 15 preferably has a progressively varying radius vector so that the last cuts correspond to very small advances, tending toward zero, in order to ensure a good finish. As this cam makes one full revolution for each piece of work, its total height of lift is constant whatever be the depth of the thread and the number of cuts.

It should be remarked that the fact that the said cam 15 is fixed at the end of its shaft 16, by means of a milled nut $15_1$ (Fig. 10) permits its easy removal and replacement, so that it can be adapted to the work to be performed.

Figure 2:
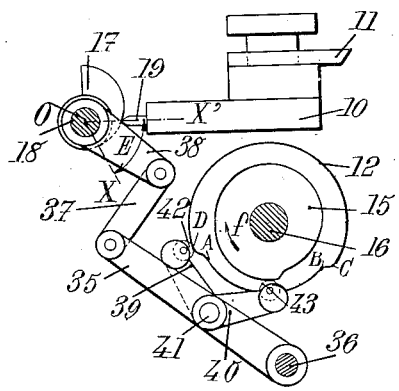

In Figs. 2 and 3, the cams have been shown in a position corresponding to the end of a machining operation, at the moment when the advance cam is to return to its initial position, the tool being still at the bottom of the thread.

At this time, the depth cam has reached a position for which a certain radius vector OX' comes opposite of the finger 19, whereas, at the beginning of the operation, and for the same position of engagement of the tool, another radius vector OX was in this position. The angle $XOX'=E$ represents the angular advance of the cam during the machining of the piece of work; the depth of cut is given by the variation of the radius vector along the portion of profile included in the angle E. The depth of cut can be modified by choosing another portion of the profile having an angular amplitude equal to E.

Concerning the adjusting means provided for this purpose, it is preferable to arrange them in such manner that the total angular advance imparted to shaft 18 during one revolution of the advance cam shall remain constant (which corresponds to the illustrated embodiment, since the advance cam always has the same total lift and its connection with the depth cam is immovable), in which case said adjustment is effected, for example, in one of the two following manners:

1. As shown by the drawings, the position of the depth cam 17 on its shaft 18 may be modified, for example by relative rotation of two suitable members 44—45 (Fig. 3).

2. The cam 17 may be so arranged that its profile can be deformed at will.

If necessary, the total angular advance imparted to the shaft 18 could be modified, by making it possible to adjust at will the connection between this shaft and the advance cam 15.

It is obvious that provision must be made for the possibility of moving cam 17 along its shaft 18 in accordance with the position of the carriage on the machine bed.

Figure 1:
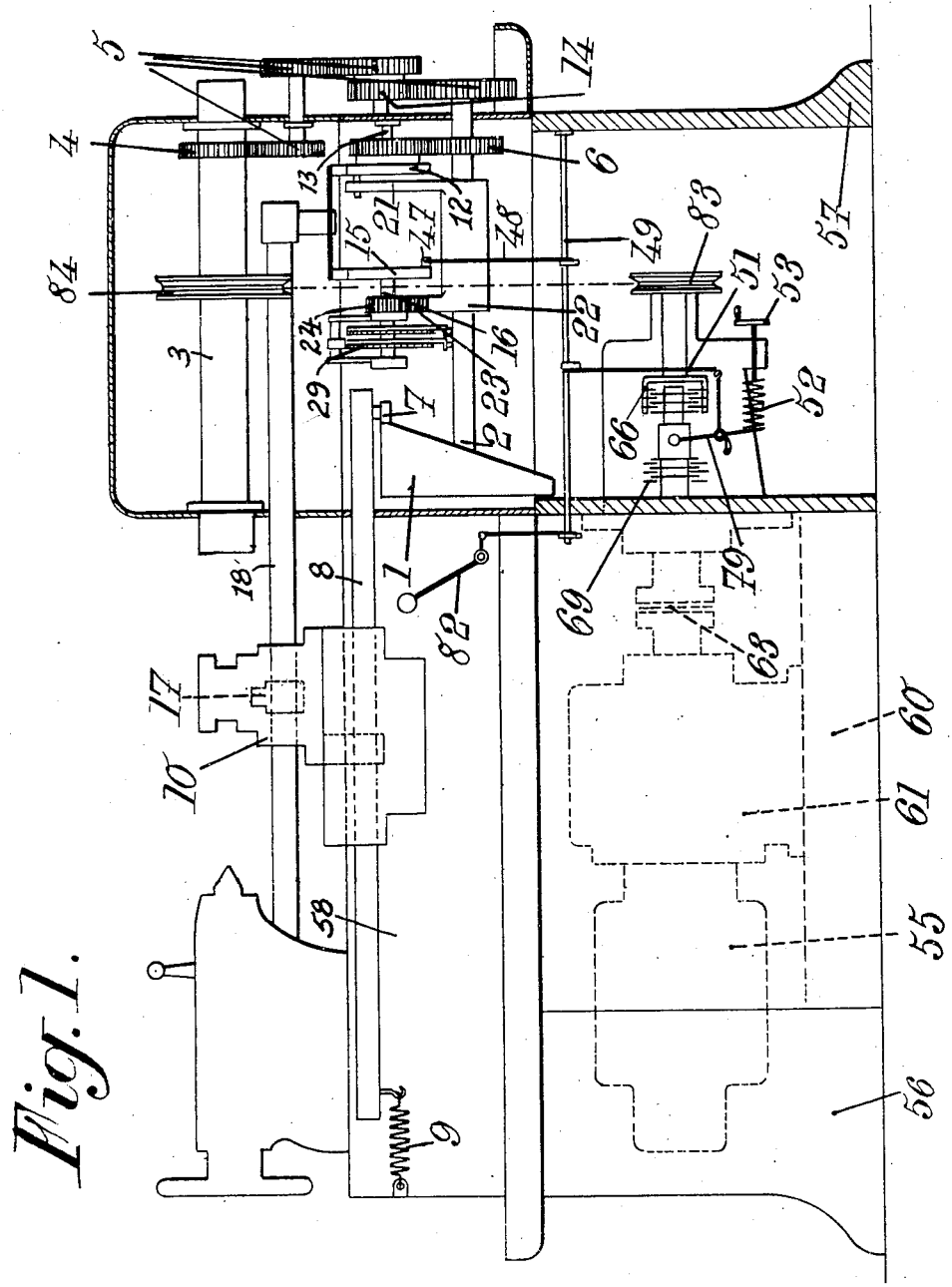

Finally, the preceding devices are completed by means, known per se, for automatically stopping the machine at the end of the last cut, that is to say when the advance cam has completed its revolution, such means acting, for example, in such a manner as to disconnect the spindle, as shown diagrammatically in Fig. 1 where a stop 47, carried by the cam 15, actuates in a suitable manner—at the end of the travel of said cam and by means of rods 48—49—the lever 51 of a coupling device, which should preferably be arranged in a manner hereinafter to be described.

In any case, it is apparent from the preceding description (which relates to the principle of the invention) that, in view of the fact that the adjustments of the various aforementioned cams are wholly independent one from the other, it is possible to solve every screw thread cutting problem, the operator being free to determine at will:

1. The length of the threads, by the shape of the pitch cam 1;

2. The pitch, by the transformation ratio between the speed of the spindle and the speed of the said cam 1;

3. The depth of the threads or, generally, the total depth of cutting, by adjustment of the depth cam 17;

4. The number of cuts by adjustment of the feed of the advance cam 15.

Various other features of the present invention will now be described.

The machine is driven, for example, by means of an electric motor 55, or the like, housed within the frame of the machine.

In Figs. 1 and 4, a complete screw thread cutting machine has been shown, the frame of which comprises two feet 56—57 carrying a bed 58 containing the various parts of the mechanism and supporting the head stock 59 as well as the movable parts of the machine: tail stock, sliding carriage with its saddle, back rest and other members which may be necessary.

The two feet are connected by cross bars 60 carrying the said motor 55, which is coupled to a speed control 61 provided with a control handle 62 operated at will. The speed control drives the coupling device of the mechanism, hereinafter to be described, through a resilient coupling 63.

This coupling device is preferably so constructed that the action of disengagement—automatically controlled, as previously explained, from the spindle or from one of the cams—is accompanied by a braking action which can be suitably controlled, so that stoppage of the spindle in a definite position can be obtained in a precise manner. It may be found advisable also to provide for an adjustment of the disengaging means, for example of the stop 47.

In order to realize the said arrangement, a clutch device including two sets of disks is preferably used (one for the letting in the clutch, the other for disengaging it and braking), in combination with an adjustable spring or any other means for adjustment of the braking action.

An arrangement of this nature is shown in Figs. 4 to 6, in which the end of a shaft 64, mounted on ball bearings and driven by the motor, forms a sleeve 65 which drives every second disc of set 66 for letting in the clutch, whilst the other discs of this set are keyed at 67 on a shaft 68. On this shaft 68 every second disc of the second set 69 is also keyed, the other discs of this second set being kept in fixed angular position by a sleeve 70 secured to the frame of the machine.

With this arrangement are associated:

1. A sleeve system 71 adapted to be moved in one direction or the other to compress one or the other of the two disc sets 66 and 69;

2. A control device to move this sleeve device at will into one or the other of its extreme positions;

3. Adjustable elastic means for urging the said sleeve towards its disconnecting position;

4. And a locking device associated with the said control to keep the clutch in the desired position against the action of the elastic means.

The sleeve 71, slidable on shaft 68, is adapted to press the sets of disks between stops such as 72—73. It can be actuated, from the control rod 51 (Fig. 5) by a lever 74 acting on a spindle 75 rigid with a lever including two opposed arms 76—77. In order to let in the clutch, the arm 76 can engage a stop 78 carried by a forked lever 79 for controlling the sleeve 71; the arm 77 cooperates with the locking device, constituted by a pawl 80 adapted to engage a notch formed in a flange 81 rigid with the fork 79.

Finally, the elastic means comprises a spring 52 which urges the fork 79 towards its disconnecting position, when its action is not neutralized by the pawl 80, and the tension of which is adjustable by means of a screw 53 (Fig. 4).

It is pointed out that there is such a play in the connection between the fork 79 and the flange of the sleeve 71 that, when the clutch is being let in (position shown in Fig. 6), it is possible to move the parts slightly beyond the locking position in order to ensure coupling as determined by the adjustment of said sleeve. The fork can then move back slightly into locking position without pressing on the sleeve 71, which is maintained in coupling position by means of an inner device (not shown). This device also permits adjustment of the position for which the clutch is let in.

Disengagement occurs when the arm 77, rotating in the $f_1$ direction, raises the pawl and unlocks arm 79 under the action of spring 52. This spring is adjusted in function of the speed and inertia of the piece to be machined, in order to obtain stoppage with sufficient accuracy at a given time of the thread cutting operation. Adjustment may be completed by altering the position of the stop 47, if need be.

It is to be understood that this arrangement could be used whatever be the means used for stopping the movement: for instance, a switch could be operated to cut off the electric current supplied to the motor without necessity of disconnecting, in which case the braking action would be effected on one of the arms. This switch could also start an electromagnetic disconnecting means.

The control rods 48 to 51 are supplemented by a hand control 82 (Fig. 1) to enable the operator to let in the clutch.

As regards the head-stock and the spindle driving mechanism, the form of embodiment shown in Fig. 7 is preferably used.

The drive of shaft 63 from pulley 83 is effected by means of trapezoidal belts. The receiving pulley 84 is keyed by means of a sleeve 85 mounted on ball bearings 86.

The spindle 3 can be driven either in a direct manner or through a gearing. For this purpose, one end of the sleeve 85 is cut in the form of a pinion 4 and meshes with a toothed wheel 87. This wheel in turn drives, through a slotted shaft 88 and a pinion 89, a concentric wheel 90 at the front part of the spindle. This wheel is mounted on two ball bearings 91 and is provided in its bore with a toothed rim 92 in mesh with a corresponding rim of a sleeve 93 slidable on the spindle 3. In the position shown, the two rims are meshing together and the drive is effected through the gearing.

In order to effect the drive directly, it suffices to slide, by means of a device not shown, simultaneously and in the same direction, the wheel 87 and the sleeve 93 so as to free the wheel 87 and to cause a toothed rim 94 of the sleeve 93 to mesh with a corresponding pinion 94₁ cut in the sleeve 85.

The connection between the sleeve 85 and the shaft 2 of the pitch cam 1 allows of variations in the transformation ratio being either progressive or by steps corresponding to as many pitches. This can be ensured, for example, by means of a gear box or, as will be shown hereafter, by means of easily removable gear wheels. Provision is also made for altering the direction of rotation of the spindle with respect to that of the shaft 2 in order to allow left handed as well as right handed threads to be cut. Preferably, the shaft 2 is always driven in the same direction, and in order to effect left handed cuts, the direction of drive of the spindle is reversed, the tool then being turned the opposite way.

Figure 8:
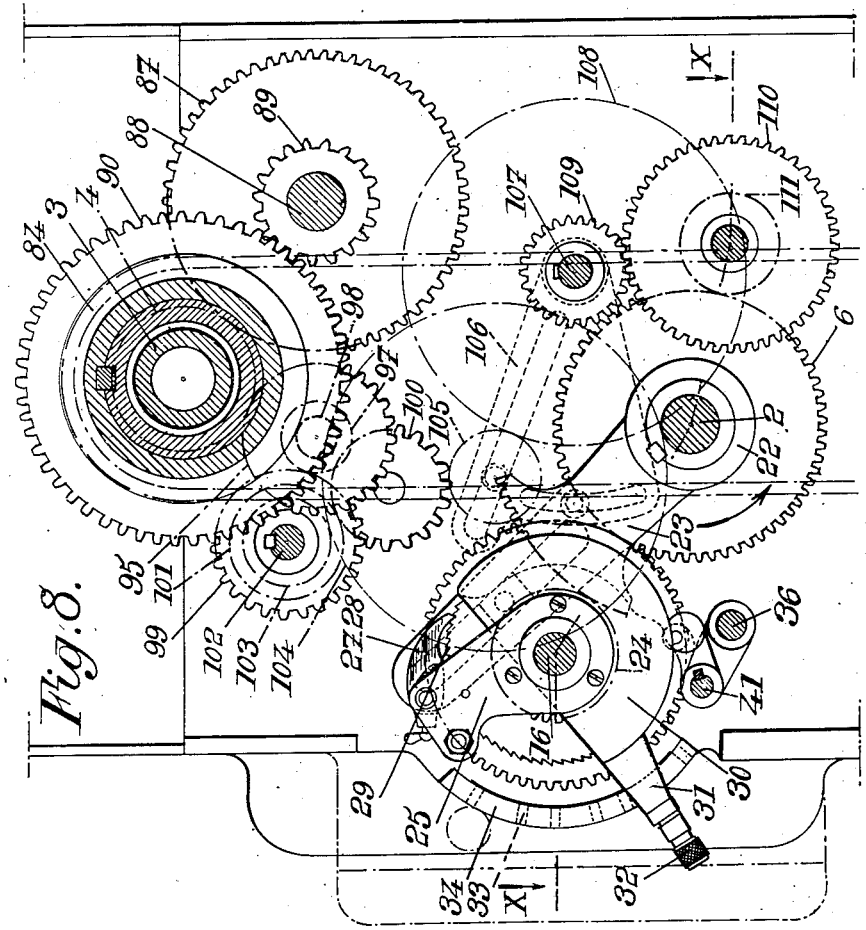

On Figs. 7 to 9, the pinion 4 of the spindle is still in mesh with a pinion 95 keyed to a grooved shaft 96. This shaft carries a double pinion 97—98 capable of meshing either with a pinion 99 or, if it does not drive this pinion, with a pinion 100 (not shown in its exact position in Fig. 7 which is supposed to be developed). This pinion 100 is constantly in mesh with another pinion 101 keyed to the shaft 102 of pinion 99. This shaft receives the first of the removable pinions or wheels 103 hereinafter referred to.

According to the position of the double pinion 97—98, rotation of shaft 102 can be effected in one direction or the other with respect to the spindle, according as it is desired to obtain a right or left handed thread.

The removable set of wheels comprises for example the four following wheels: wheel 103 on shaft 102, wheels 104 and 105 on an arm 106 which can be angularly positioned on a spindle 107, and a wheel 108 on said spindle.

A set of fixed wheels 109—110—111—6 is provided on shaft 2, as already illustrated in Figs. 1 to 3.

It is not necessary to refer again to the part played by cam 1, already described. It may be stated, however, that a device may be made to cooperate with said cam, in order to permit of limiting, for certain operations, the longitudinal stroke of the tool carrying carriage, the part 10 of which is supposed to be secured to shaft 8 (Figs. 1, 4 and 16). To this end, it suffices to cause the end of the said shaft to bear against a screw 112 (Fig. 4) adjustable by means of a handwheel 113, so that the roller 7 no longer reaches the bottom of cam 1. This arrangement enables the cam no longer to stand under the action of the roller when changing same.

In Fig. 11, for the sake of clearness, a developed diagrammatical view of the profile of the pitch cam 1 has been shown. It comprises the following portions:

1. A portion FG, corresponding to the starting position of the carriage before each cut and to the transverse feed of the tool caused by the cam devices 12—15—17;

2. A portion GH, of helical shape, corresponding to the tool working phase;

3. A portion HI, corresponding to the position when cutting is stopped and the tool is retracted under the action of the retracting spring 114 of the carriage 10 towards the cam 17;

4. A portion IJ corresponding to the return of the carriage to the starting position at a greater speed than that of the working phase, under the action of the spring 9, the tool being withdrawn from the thread.

Transmission of the various movements from the shaft 2 to the cams 12—15—17 has been described above and it is only shown, in greater detail, in Figs. 2 to 4 and 8 to 10. These figures show in particular the four groups of ratchet wheels with their disconnector devices.

We claim:

1. In a machine tool including a tool for machining a work, a feed control mechanism comprising in combination, a pitch cam controlling the length of the longitudinal traverse of the tool and work with respect to each other, a return cam driven at the same angular speed as the said pitch cam and controlling the engagement and disengagement of the tool with the work at each longitudinal traverse, an advance cam adapted to rotate through a definite angle during a complete machining operation, at least one ratchet wheel provided with an adjustable disconnector device controlled by the said return cam to enable the said ratchet wheel to advance through a variable number of teeth at each longitudinal traverse, the said advance cam being secured to said ratchet wheel, and a depth cam controlled by said return and advance cams for determining the depth of cut at each successive longitudinal traverse.

2. A machine tool which comprises, in combination, a tool, a tool holder, a work holder, said two holders being movable relatively to each other with both longitudinal and transverse displacements, a driving part, means operative by said driving part for moving said holders with respect to each other, said means including a pitch cam for controlling the length of longitudinal traverse of said holders with respect to each other, a return cam for controlling the relative disengagement movement of said holders with respect to each other at the end of each of said longitudinal traverses and their reengagement movement at the beginning of the next longitudinal traverse, an advance cam, means operative by said advance cam for controlling the number of longitudinal traverses of said holders with respect to each other for every complete machining operation, and a depth cam for controlling the depth of cut of said tool on every successive longitudinal relative traverse of said holders.

3. A machine tool which comprises, in combination, a tool, a tool holder, a work holder, said two holders being movable relatively to each other with both longitudinal and transverse displacements, a driving part, and means operative by said driving part for moving said holders with respect to each other, said means including a pitch cam for controlling the length of longitudinal traverse of said holders with respect to each other, a return cam arranged to rotate at the same speed as said pitch cam for controlling the relative disengagement movement of said holders with respect to each other at the end of each of said longitudinal traverses and their reengagement movement at the beginning of the next longitudinal traverse, an advance cam, means operative by said advance cam for controlling transverse displacements of said holders with respect to each other on every longitudinal traverse thereof, means interposed between said driving part and said advance cam for causing the latter to turn through a succession of angles each corresponding to a longitudinal relative traverse of said holders and the total of which makes a given angle, a depth cam for controlling the depth of cut of said tool for every successive longitudinal traverse of said holders, and means for actuating said depth cam in response to the displacements of both said return cam and said advance cam.

4. A machine tool according to claim 3, the last mentioned means including a shaft for carrying said depth cam, said depth cam being adjustably fixed on said shaft.

5. A machine tool which comprises, in combination, a tool, a tool holder, a work holder, said two holders being movable relatively to each other with both longitudinal and transverse displacements, a driving part, and means operative by said driving part for moving said holders with respect to each other, said means including a pitch cam for controlling the length of longitudinal traverse of said holders with respect to each other, a return cam arranged to rotate at the same speed as said pitch cam for controlling the relative disengagement movement of said holders with respect to each other at the end of each of said longitudinal traverses and their reengagement movement at the beginning of the next longitudinal traverse, an advance cam adapted to rotate through a given angle for every complete machining operation, adjustable mechanical means for operatively connecting said advance cam and said return cam to cause said advance cam to rotate through any of a plurality of fractions of said angle upon every longitudinal relative traverse of said holders, a depth cam for controlling the depth of cut of said tool for every successive longitudinal relative traverse of said holders, and means for actuating said depth cam in response to the movements of both of said return cam and said advance cam.

6. A machine tool according to claim 5 in which the last mentioned means consist of two rollers mounted to run on said return cam and said advance cam respectively, and kinematic means operative by said rollers for actuating said depth cam.

7. A machine tool according to claim 2 further including a frame, bearings carried by said frame for said cams and said driving part, a shaft slidable in said frame in the longitudinal traverse direction and carrying one of said holders, a roller carried by said shaft and adapted to run on said pitch cam, and spring means for urging said shaft in a direction opposed to the action of said pitch cam.

8. A machine tool according to claim 3 including a frame, bearings carried by said frame for said cams and said driving part, a shaft slidable in said frame in the longitudinal traverse direction and carrying one of said holders, a roller carried by said shaft and adapted to run on said pitch cam, and spring means for urging said shaft in a direction opposed to the action of said pitch cam.

9. A machine tool according to claim 5 including a frame, bearings carried by said frame for said cams and said driving part, a shaft slidable in said frame in the longitudinal traverse direction carrying one of said holders, a roller carried by said shaft adapted to run on said pitch cam, and spring means for urging said shaft in a direction opposed to the action of said pitch cam.

10. A machine tool according to claim 2 in which said advance cam is removable.

ARDOIN, AIMÉ.
CHENILLAT, MICHEL.

REFERENCES CITED

The following references are of record in the file of this patent:

UNITED STATES PATENTS

| Number | Name | Date |
|---|---|---|
| 598,002 | Noble | Jan. 25, 1898 |
| 1,322,352 | Schellenbach | Nov. 18, 1919 |
| 1,373,158 | Wilcox | Mar. 29, 1921 |
| 1,476,114 | Sundstrand | Dec. 4, 1923 |
| 1,501,076 | Townsend | July 15, 1924 |
| 2,265,265 | Castelli | Dec. 9, 1941 |
| 2,297,501 | Roloff | Sept. 29, 1942 |